(12) United States Patent
Mikkaichi et al.

(10) Patent No.: US 7,059,656 B2
(45) Date of Patent: Jun. 13, 2006

(54) VEHICLE WINDOW MOLDING

(75) Inventors: Toshiki Mikkaichi, Yokohama (JP); Tomoaki Okano, Yokohama (JP)

(73) Assignee: Altia Hashimoto Co., Ltd., Kawasaki (JP)

( * ) Notice: Subject to any disclaimer, the term of this patent is extended or adjusted under 35 U.S.C. 154(b) by 0 days.

(21) Appl. No.: 10/844,440

(22) Filed: May 13, 2004

(65) Prior Publication Data

US 2005/0006922 A1    Jan. 13, 2005

(30) Foreign Application Priority Data

May 15, 2003   (JP) ............................. 2003-137810

(51) Int. Cl.
*B60J 10/02*   (2006.01)
(52) U.S. Cl. ............... 296/146.15; 296/93; 52/204.597
(58) Field of Classification Search ............. 296/93, 296/146.15; 52/204.597
See application file for complete search history.

(56) References Cited

U.S. PATENT DOCUMENTS 3,177,534 A * 4/1965 Millhouse et al. ............ 52/394
4,984,839 A * 1/1991 Miyakawa et al. ........... 296/93
5,429,844 A * 7/1995 Galardi ........................ 428/31
6,017,038 A    1/2000 Wato et al. .................... 296/93
6,460,300 B1 * 10/2002 Mikkaichi et al. ...... 52/204.597

FOREIGN PATENT DOCUMENTS

JP    U 58-47511    3/1983

* cited by examiner

*Primary Examiner*—Dennis H. Pedder
(74) *Attorney, Agent, or Firm*—Oliff & Berridge, PLC

(57) ABSTRACT

A vehicle window molding for covering a gap between an outer peripheral edge surface of a vehicle windowpane and a vehicle body panel includes a molding body mounted in abutment against the outer peripheral end surface of the windowpane. An engaging member extends from the molding body to engage with the windowpane on the side of passenger compartment of the vehicle body. A seal lip extends from the molding body to abut against a stepped surface of the vehicle body panel. A support lip extends toward the molding body from a part of the seal lip where the seal lip abuts against said stepped surface. An abutting member is formed at a distal end part of the support lip to press the molding body in a slidable condition. A holding member has a holding surface that abuts against the support lip to hold the abutting member in a condition in which the molding is fitted to the vehicle body.

18 Claims, 5 Drawing Sheets

VEHICLE WINDOW MOLDING

BACKGROUND OF THE INVENTION

1. Technical Field

The present invention relates to a vehicle window molding that can be mounted between a vehicle windowpane and a vehicle body panel, for providing ornamental and sealing functions for the passenger compartment of vehicles.

2. Related Art

A typical structure of a vehicle window molding is explained below with reference to FIG. 1, which illustrates a vehicle body 1 and a window 2 in the form of a windshield. The window 2 includes a windowpane 3 that is mounted on a vehicle body panel 4 so as to leave a gap 5 between the outer periphery of the windowpane 3 and the vehicle body panel 4, which gap is covered by a window molding 6.

Conventionally, the window molding 6 has a seal lip that extends from the molding body fitted in the gap 5, in order to cover part of the vehicle body panel 4 on the exterior side of the vehicle. The seal lip is made of a relatively soft material, such as soft resin or synthetic rubber, and has a thickness that decreases toward its distal end, so as to absorb dimensional fluctuation of the vehicle body panel and thereby realize as flush a surface as possible. Thus, during high-speed running of the vehicle, exhausting draft is caused by a negative pressure to flow out of the gap 5 toward the rear side of the seal lip, causing the distal end of the seal lip to vibrate thereby generating undesirable noise.

A window molding is disclosed in U.S. Pat. No. 6,017,038, which has been devised to prevent generation of such noise. This window molding 6 is shown in FIG. 2, which is a sectional view taken along line A—A in FIG. 1. It is assumed that the vehicle body panel 4 has an outer surface 4a, a stepped surface 4b and a flange 4c. The window molding 6 is fitted in the gap 5 between the windowpane 3 and the vehicle body panel 4. An adhesive 7 fixedly connects the windowpane 3 and the window molding 6 relative to the flange 4c, with a dam rubber 8 blocking the adhesive 7 from spilling.

In the window molding 6 shown in FIG. 2, the seal lip 12 extends toward the outer surface 4a of the vehicle body panel 4, from the passenger compartment side of the molding body 11 that is located in the gap 5 between the outer peripheral edge of the windowpane 3 and the vehicle body panel 4. The seal lip 12 has a fold-back lip 13 at its distal end portion, which is folded back toward the vehicle compartment so as to abut against the stepped surface 4b. The window molding of such a structure is based on a premise that, when the seal lip 12 is sucked outward of the vehicle under a negative pressure during high-speed running of the vehicle, exhaust draft is prevented from flowing outside of the vehicle due to the abutment of the fold-back lip 13 against the stepped surface 4b, thereby making it possible to prevent undesired noise generation due to vibration at the distal end of the seal lip 12 in the form of the fold-back lip 13.

However, in the window molding 6 shown in FIG. 2, since the molding body 11 is secured in place solely by means of the adhesive 7, if a force is exerted to the molding member 6 from the windowpane 3 during cleaning thereof or the like, the molding body 11 may lean toward the vehicle body panel 4. A gap is then formed between the molding body 11 and the windowpane 3, in which foreign matters such as dust or sand particles may be trapped. Moreover, since the window molding 6 has a channel 9 in its outer surface, it is likely to cause noise generation. Further, if the window molding has a curvature in its longitudinal direction along the corner part 10 of the window 2, the seal lip 12 tends to lean toward the molding body 11 thereby causing a gap between the fold-back lip 13 of the seal lip 12 and the vehicle body panel 4. Thus, not only the overall appearance deteriorates, but also exhausting draft flows outward the vehicle through the gap due to negative pressure during high-speed running of the vehicle, thereby possibly causing undesired noise generation.

Furthermore, since the fold-back lip 13 of the window molding 6 shown in FIG. 2 extends inwards from the outside of the vehicle along the stepped surface 4b, the seal lip 12 tends to lean away from the stepped surface 4b during high-speed running, and pebbles of a size slightly larger than sand may be trapped in the gap that is being formed between the fold-back lip 13 and the stepped surface 4b. When the vehicle then resumes a low speed running state, the seal lip 12 restores to the initial position while closing the gap with the pebbles trapped as being invisible by users. Thus, if the window is wiped or cleaned with clothes or the like, the molding body 11 may lean toward the vehicle body panel, with the pebbles breaking through the fold-back lip 13 thereby causing scratches or damages of the vehicle body, as the case may be.

A window molding having a similar configuration is disclosed in Japanese Utility Model Application Laid-open Publication JP-U-58-47511. This window molding is shown in FIG. 3, which also is a sectional view taken along the line A—A in FIG. 1. It is noted that this window molding 6 is intended primarily to prevent exposure of the channel 9 between the molding body 11 and the seal lip 12 so as to prevent floating of the molding body 11 on the vehicle body panel side at the corner part of the window 2.

In this instance, the molding body 11 is located in the gap 5 between the outer peripheral edge surface of the windowpane 3 and the vehicle body panel 4, and the seal lip 12 extends from the passenger compartment side of the molding body 11 toward the outer surface 4a of the vehicle body panel 4. A first lip 14 extends from the distal end of the seal lip 12 so as to cover the outer surface 4a of the vehicle body panel 4. A second lip 15 extends also from the distal end of the seal lip 12 in opposite direction to the first lip 14, and is brought into strong resilient contact with the rear side of a protrusion 16 of the molding body 11. A leg part 17 extends from the molding part 11 into the gap 5, and is formed at its distal end with an anchor part 18 that is embedded in the adhesive 7 and is thereby fixedly anchored. Third lips 19 extend from the leg part 17 toward the edge surface of the windowpane 3 so as to engage therewith.

It is intended that the window molding 6 shown in FIG. 3 prevents exposure of the channel 9 by means of the lip 15, and also prevents float-up of the molding body in its region along the corner part of the window and on its side adjacent to the vehicle body panel 4. However, since the first lip 14 extends to cover the outer surface 4a of the vehicle body panel 4, undesired noise tends to be generated due to vibration of the lip 14 during high-speed running of the vehicle, depending upon the configuration or structure of the lip 14.

It is also intended that the window molding 6 shown in FIG. 3 prevents the groove part from being clogged with dust, sand, wax or the like, and to prevent rusting in the gap, though there is no disclosure as to the width of the molding, measures for preventing generation of noise or measures for facilitating installation. In this case, since the second lip 15 is strongly brought into resilient contact with the protrusion 16, the first lip 14 must be arranged on the outer surface 4a (first grade surface) of the vehicle body panel 4 and, thus, it is not readily possible to realize a narrow configuration of the window molding.

Further, the strong resilient contact of the second lip 15 with the protrusion 16 produces a force, by which the anchor part 18 tends to float up from the adhesive 8 is effected. Thus, the second lip 15 and the protrusion 16 are likely to make relatively loose contact with each other after curing of the adhesive 8, even though they had been made into close contact with each other before curing of the adhesive at the initial stage upon fitting of the window molding. In addition, also when the windowpane is situated at a relatively high level due to fluctuation in the positional relationship between the windowpane 3 and the vehicle body panel 4, the lip 15 and the protrusion 16 are likely to make loosely contact with each other. In these cases, the second lip 15 is likely to vibrate, thereby generating undesired noise.

Further, although it is stated that the third lips 19 making contact with the edge surface of the windowpane 3 serve to prevent the molding body 11 from floating up and position the molding body 11 in place, the edge surface of the windowpane 3 is generally chamfered for the purpose of safety and, thus, the lips 19 tend to slip on the edge surface of the windowpane 3 thereby failing to prevent the molding body from floating up.

Moreover, as in the case of the window molding 6 shown in FIG. 2, if an external force is exerted to the molding boy 11 from the windowpane 3 during cleaning of the window 2, the molding body 11 tends to lean toward the vehicle body panel 4, thereby forming a gap between the molding body 11 and the windowpane 3, in which dust is likely to accumulate.

DISCLOSURE OF THE INVENTION

It is a primary object of the present invention to provide an improved vehicle window molding which eliminates or at least mitigates the above-mentioned problems of the prior art.

According to the present invention, there is provided a vehicle window molding for covering a gap between an outer peripheral edge surface of a vehicle windowpane and a vehicle body panel, comprising: a molding body mounted so as to abut against the outer peripheral end surface of the windowpane; an engaging member extending from the molding body so as to engage with the windowpane on the side of a passenger compartment of the vehicle body; a seal lip extending from the molding body so as to abut against a stepped surface of the vehicle body panel; a support lip extending toward the molding body from a part of the seal lip where the seal lip abuts against said stepped surface; an abutting member formed at a distal end part of the support lip so as to press the molding body in a slidable condition; and a holding member having a holding surface which abuts against the support lip so as to hold the abutting member of the support lip in a condition in which the molding is fitted to the vehicle body.

It is preferred that the holding member has a curved holding surface against which the abutting member of the support lip abuts, and, in particular, the holding surface has a curved shape corresponding to that of the abutting member. With this arrangement, the support lip can easily slide to enhance the holding ability, thereby positively preventing vibration of the support lip. The molding body may have a head part extending so as to engage with the windowpane on the outside of the vehicle, though the head part may be omitted particularly when the window molding is pre-integrated with the windowpane as part of a window module.

It is preferred that the components of the window molding according to the present invention, such as the molding body, the seal lip, the support lip and the like, are made of resin such as synthetic resin or rubber, though the materials may be blended with other materials such as metal materials, or fiber materials. When such blended materials are used, it is preferred that the window molding is integrally and continuously formed by extrusion molding process, though other processes, such as injection molding process, may also be adopted.

The components of the window molding according to the present invention, such as the molding body, the seal lip, the support lip and the like, may be formed from one and the same material, though they are preferably formed from different materials suitably selected depending upon their respective functions. Thus, for example, the molding body is preferably formed from a relatively stiff material having stiffness and flexibility so as to maintain its fitted condition onto the window while restraining deformation thereof that may be caused by external force. There may be used stiff synthetic resin having a Shore harness of 90 to 100 deg., such as PVC, CAB, EVA, PE or EPDM. Furthermore, there may be used resin embedding therein metal wires, such as steel wires or copper wires, or cord-like cores, such as glass fiber strands, which do not substantially expand of contact, or of which the amount of expansion or contraction is more or less predictable.

It is preferred that the seal lip and the support lip are made of soft resilient materials having stiffness lower than that of the molding body, and may be integrally formed from one and the same material. Further, the holding surface of the holding member may be made of a soft resilient material having stiffness lower than the molding body. In this case, the distal end part of the seal lip may have an extension extending outward the vehicle from the end part of the molding body on the passenger compartment side along the holding member so as to define a holding surface, while the seal lip and the support lip may be integrally formed with each other from the one and the same material. It is preferred that the molding body has cushion members in regions which abut against the windowpane, which cushion members are made of a resilient material having stiffness lower than the molding body. As to these soft materials, there may be used soft resin materials such as polyvinyl chloride resin having a Shore hardness of 60 to 70 deg., or natural or synthetic rubber. For example, there may be used soft PVC containing paraffin wax or chlorinated ethylene polymer, which exhibits less friction relative to the windowpane or the vehicle body panel.

The vehicle window molding according to the present invention is fitted in a gap between the outer peripheral edge surface of the windowpane and the vehicle body panel as follows. That is to say, the molding body is fitted so that the engaging member extending from the molding body is engaged with the outer peripheral edge surface of the windowpane. On this occasion, the seal lip extending from the molding body abuts against a stepped surface of the vehicle body panel. The support lip extending from the part of the seal lip, which is in abutment against the stepped surface, abuts against the molding body side so as to support the molding body. The abutting member formed in the distal end part of the support lip in a curved shape abuts against and press the holding surface of the holding member of the molding body in a slidable condition in which the holding surface of the holing member of the molding body holds the abutting member of the support lip.

In the thus fitted vehicle window molding according to the present invention, the molding body is fitted so as to abut against the outer peripheral edge surface of the windowpane while the seal lip extending from the molding body abuts against the stepped surface of the vehicle body panel. Further, the molding body is pressed and supported by the abutting member formed in the support lip, which extends from the part of the seal lip in abutment against the stepped surface. Thus, the molding body is pressed against the outer peripheral edge surface of the windowpane so that it can hardly lean toward the vehicle body panel, and accordingly, it is possible to prevent formation of a gap between the molding body and the windowpane, even when an external force is exerted from the from the windowpane, thereby preventing accumulation of dust in such gap and maintain an excellent appearance of the window as a whole.

In the vehicle window molding according to the present invention, the engaging member extending from the molding body engages with the passenger compartment side of the windowpane. Thus, the molding body can be fitted without being floated up during installation of the window molding, thereby ensuring that the molding body can be simply and positively fitted to the windowpane. When the molding body has the head part, which engages with the windowpane on the outside of the vehicle, the head part cooperates with the engaging member to positively grip the windowpane therebetween, so that the molding body is fixedly secured to the windowpane and maintained in place with sufficient reliability.

Further, in the vehicle window molding according to the present invention, the curved abutting member formed in the distal end part of the support lip abuts against the molding body which is therefore is pressed in a slidable condition. Thus, the abutting member is slidable to facilitate its insertion during installation, and the window molding can be easily fitted without forming crease or the like even under fluctuation in the positional relationship between the windowpane and the vehicle body panel, thereby making it possible to exhibit an excellent appearance of the window as a whole. When the holding member has the holding surface in a curved shape which corresponds in particular to the curved shape of the abutting member, the support slip can easily slide and the area of the abutting surface of the curved abutting member can be increased, thereby enhancing the holding ability of the holding member for the support member, and positively preventing vibration of the support lip.

Moreover, in the above-mentioned vehicle window molding according to the present invention, the holding surface of the holding member abuts against the abutting member of the support lip which is therefore supported, so that the support lip can easily slide and the holding surface holds the support lip to effectively prevent vibration of the support lip, thereby prevent generation of noise during high-speed running of the vehicle.

Since the seal lip and the support lip are made of soft resilient materials having stiffness which is lower than the molding body, the seal lip and the support lip can be readily fitted during installation of the molding, and the holding ability of the abutting member for the support lip can be improved by the holding surface of the holding member. In this case, when the holding surface of the holding member is made of a soft material having stiffness lower than the molding body, it is possible to improve the fitting ability of the support lip and the holding ability of the abutting member, and they can be both molded from one and the same resin material, thereby allowing facilitated manufacture of the vehicle window molding.

When the proximal end part of the seal lip extends outward the vehicle from the end part of the molding body on the passenger compartment side so as to define a holding surface, they can be molded from one and the same resin material, thereby allowing facilitated manufacture of the vehicle window molding.

When the molding body has at least one cushion member in a region abutting against the windowpane, which is made of a soft resilient material having stiffness lower than the molding body, the molding body can be readily fitted to the windowpane, while preventing breakage of the windowpane and enhancing the fitting stability.

BRIEF DESCRIPTION OF THE DRAWINGS

Explanation will be hereinafter made of embodiments of the present invention with reference to the accompanying drawings, wherein the same reference numerals are used to denote the same or corresponding elements.

DESCRIPTION OF THE PREFERRED EMBODIMENTS

Figure 1:
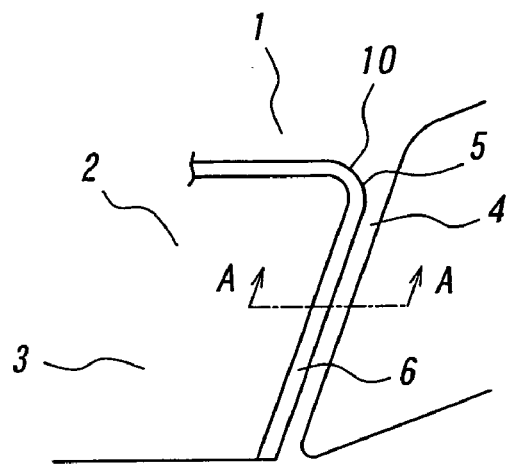
FIG. 1 is a perspective view illustrating a part of the front window of a vehicle, to which the present invention can be suitably applied.
Figure 2:
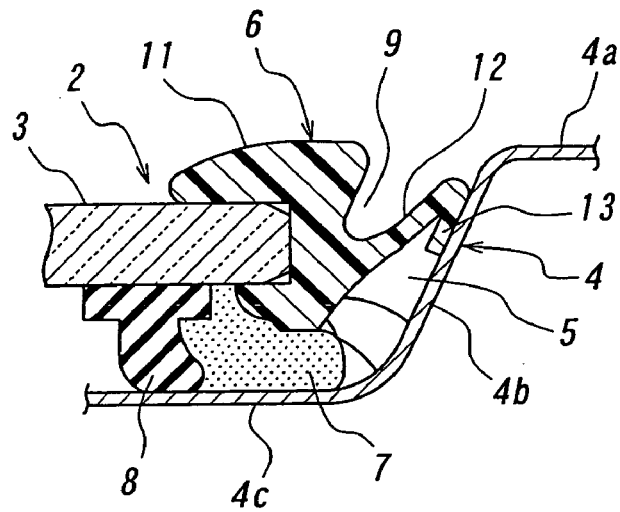
FIGS. 2 and 3 are sectional views taken along line A—A in FIG. 1, showing conventional window moldings, respectively.
Figure 3:
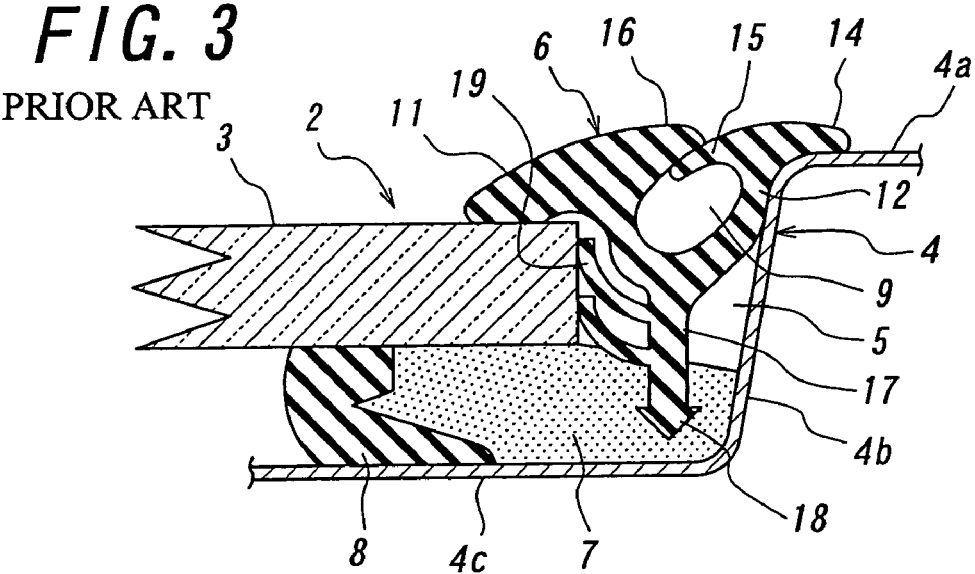

A vehicle window molding 6 according to a preferred embodiment of the present invention will be explained below with reference to FIGS. 4 and 5, which is illustrated as being for a front window, i.e., a windshield of a vehicle. The window molding 6 according to the present invention comprises a molding body 11 fitted so as to abut against the outer peripheral edge surface of a windowpane 3. An engaging member 20 extends from the molding body 11 so as to engage with the passenger compartment side of the windowpane 3. A seal lip 12 extends from the molding body 11 so as to abut against a stepped surface 4b of a vehicle body panel 4. A support lip 21 extends from that part of the seal lip 12 which abuts against the stepped surface, toward the molding body 11. An abutting member 22 is formed in the distal end part of the support lip 21 in a curved shape so as to press the molding body 11 in a slidable condition. A holding member 23 is provided for the molding body 11 so as to hold the abutting member 22 of the support lip 21 in a condition in which the window molding 6 is fitted to the vehicle body.

The holding member 23 has a curved holding surface 24 adapted to abut against the abutting member 22, and the curved shape of the holding surface 24 corresponds to the curved shape of the abutting member 22. The molding body 11 has a head part 25 extending so as to engage with the windowpane 3 on the outside of the vehicle. Further, the molding body 11 has cushion members 26a, 26b, 26c in regions thereof abutting against the edge surface and the inner and outer surfaces of the windowpane 3.

The molding body 11, the engaging member 20, the holding member 23 and the head part 25 are made of soft synthetic resin having a Shore hardness of 90 to 100 deg., as a relatively stiff material having a flexibility, with a reinforcement 27 embedded therein, which is comprised of metal wires, such as steel wires or copper wires, or cord-like cores, such glass fiber strands, and which does not substantially expand and contract or of which the amount of expansion or contraction is more or less predictable. The seal lip 12, the support lip 21, the holding surface 24 and the cushion members 26a, 26b, 26c are made of soft material having stiffness lower than the molding body 11. These components are integrally molded by extrusion molding process carried out to form the window molding 6 having the configuration shown in FIG. 4.

Figure 4:
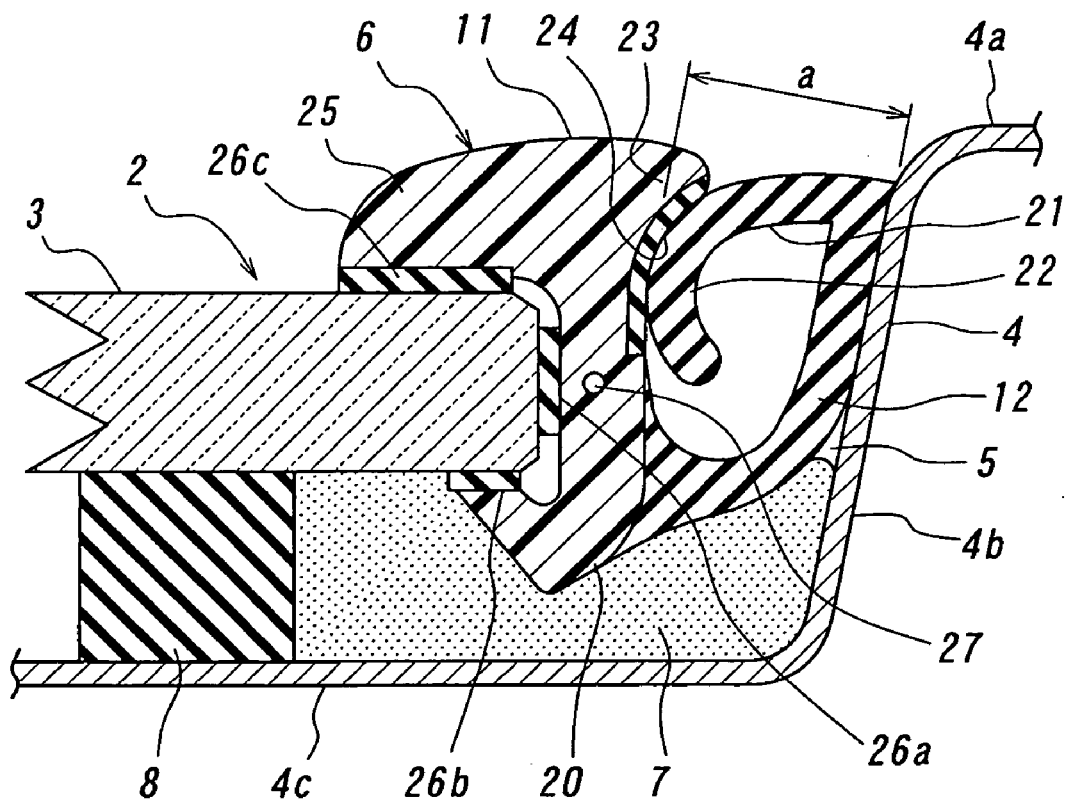
FIG. 4 is a sectional view similar to FIGS. 2 and 3, illustrating a vehicle window molding according to one embodiment of the present invention, wherein the window molding has already been mounted in place.
Figure 5:
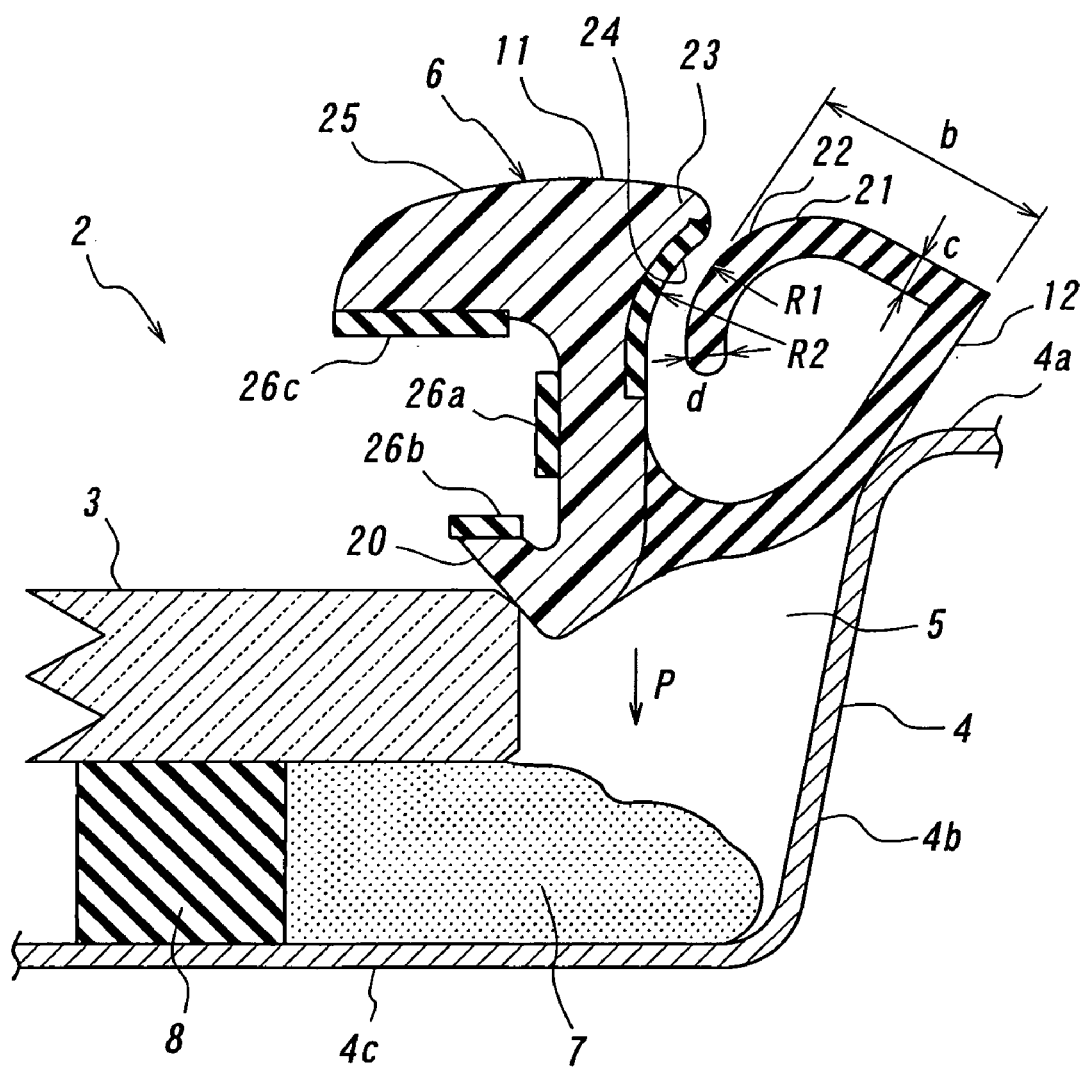
FIG. 5 is a sectional view of the vehicle window molding shown in FIG. 4, during a stage wherein the window molding is being mounted in place.

In the above-mentioned window molding 6, the projecting length "b" of the abutting member 22 of the support lip 21 from the seal lip 15 before it is fitted as shown in FIG. 5 is larger than the projecting length "a" of the abutting member 22 of the support lip 21 from the seal lip 12 after it has been fitted as shown in FIG. 4. The thickness "d" of the abutting member 22 is larger than the thickness "c" of the support lip 21, and is preferably increased toward the distal end. The radius of curvature R1 of the curved shape of the abutting member 22 may be larger than, or smaller than the radius of curvature R2 of the curved shape of the holding surface 24. However, it is preferred for the abutting member 22 to have a larger radius of curvature R1 in order to positively achieve a close contact by its resiliency.

The above-mentioned window molding 6 is inserted in the direction of arrow P in such a condition that an adhesive 7 is applied between the outer peripheral edge part of the windowpane 3 and a flange 4c of the vehicle body panel 4. The molding body is fitted so that the cushion members 26a, 26b, 26c are brought into abutment against the outer peripheral edge surface and the outer and inner surfaces of the windowpane 3. As a result, the engaging member 20 extending from the molding body 11 and the head part 25 are engaged with the windowpane 3 on the outside and inside of the vehicle, respectively, to bring the seal lip 12 extending from the molding body 11 into contact with the stepped surface 4b of the vehicle body panel 4. The support lip 21 then extends from the part of the seal lip 12 which abuts against the stepped surface 4 toward the molding body 11, thereby allowing the curved abutting member 22 formed in the distal end part of the support lip 21 to abut against the holding surface 24 of the holding member 23 of the molding body 11. By this, the holding surface 24 is pressed in a slidable condition in which the holding surface 24 of the holding member 23 supports the abutting member 22 of the support lip 21. In this way, the window molding 6 is fitted in place. That is to say, once the adhesive 7 cures in a condition shown in FIG. 4, the window molding 6 is fitted in the gap 5 between the outer peripheral edge surface of the windowpane 3 and the vehicle body panel 4.

Figure 6:
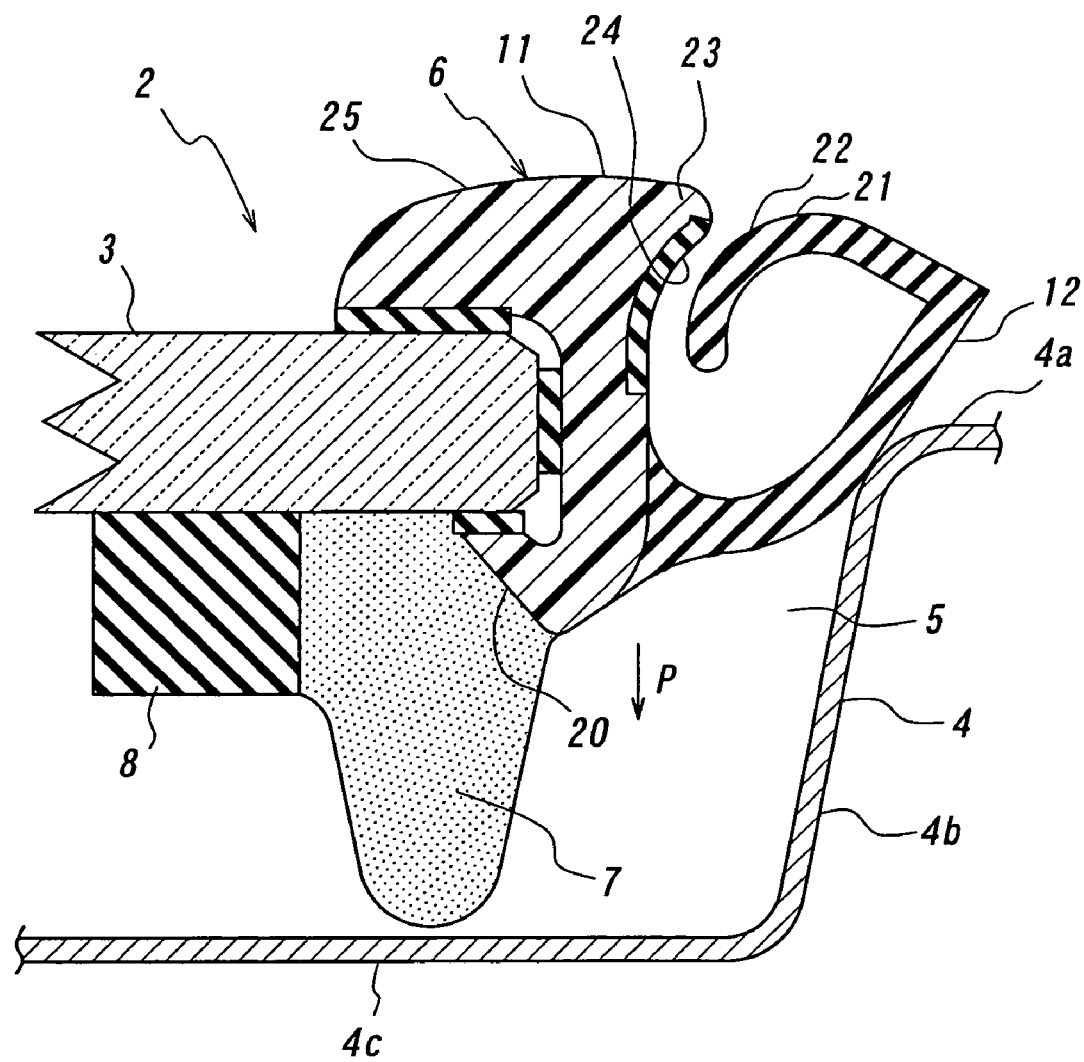
FIG. 6 is a sectional view similar to FIG. 5, showing a modified embodiment wherein the vehicle window molding is pre-integrated with the windowpane to form a window module.

In a variant as shown in FIG. 6, the window molding 6 is pre-integrated with the windowpane 3, as part of a window module. In this instance, the window module as a whole, including the windowpane 3 and the window molding 6, is bodily inserted in the direction of arrow P into the mounted position similar to that shown in FIG. 4, and the adhesive 7 is then cured.

In the thus fitted vehicle window molding 6, the molding body 11 is fitted so as to abut against the outer peripheral edge surface of the windowpane 3 and the seal lip 12 extends from the molding body 11 so as to abut against the stepped surface 4b of the vehicle body panel 4. Further, the molding body 11 is pressed by the abutting member 22 formed in the support lip 21 extending from the part of the seal lip 12 which abuts against the stepped surface 4b, and the molding body 11 is pressed against the outer peripheral edge surface of the windowpane 3 so that the molding body 13 can hardly lean toward the vehicle body panel 4 even when an external force is exerted thereto from the windowpane 3 side. It is thus possible to prevent formation of a gap between the molding body 11 and the windowpane 3, to positively avoid accumulation of dust in such gap, and to thereby maintain excellent appearance of the window as a whole.

In the above-mentioned vehicle window molding 6, the engaging member 20 extends from the molding body 11 and engages with the passenger compartment side of the windowpane 3. Thus, the molding body is prevented from being floated up when it is fitted during installation of the molding and, accordingly, the molding body 13 can be simply and precisely fitted to the windowpane 3. Further, since the molding body 11 has the head part 25 extending so as to engage the windowpane 3 on the outside of the vehicle, the head part 25 cooperates with the engaging member 20 to grip the windowpane 3 therebetween, so that the molding body 11 is fitted to the windowpane 3 highly reliably. Further, since the molding body 11 has the cushion members 26a, 26b, 26c made of a soft material having stiffness smaller than the molding body, in regions which abut against the windowpane 3, the molding body 13 can be simply fitted to the windowpane 3, while preventing the windowpane 3 from being broken and enhancing the fitting stability.

Further, in the above-mentioned vehicle window molding 6, the curved abutting member 22 formed in the distal end part of the support lip 21 presses the molding body 11 in a slidable condition, and the abutting member 22 is slidable during installation so as to facilitate the insertion thereof, without forming crease or the like even under fluctuation in the positional relationship between the windowpane 3 and the vehicle body panel 4. Thus, the molding can be simply fitted at a precise position, and realizes excellent appearance of the window as a whole. Since the holding member 23 has the curved holding surface 24 corresponding to the curved shape of the abutting member 22, the support lip 21 can easily slide, and the abutting area of the curved abutting member 22 can be increased so as to enhance the holding ability of the support lip 21 to the holding member 23, thereby positively preventing vibration of the support lip 21.

Moreover, in the above-mentioned vehicle window molding 6, since the holding surface 24 of the holding member 23 abuts so as to hold the abutting member 22 of the support lip 21, the support lip 21 can easily slide, and the holding surface 24 can hold the support lip 21 so as to prevent vibration of the support lip 21. It is thus possible to prevent vibration of the support lip 21 and generation of noise even under negative pressure during high-speed running of the vehicle.

The seal lip 12 and the support lip 21 are made of a soft material having stiffness lower than the molding body 11, so as to improve the mounting ability of the seal lip 14 and the support lip 21 during installation of the molding 6, and the holding ability for the abutting member 22 of the support lip 21 by means of the holding surface 24 of the holding member 23. In this case, since the holding surface 24 of the member 23 is made of a soft material having stiffness lower than the molding body 11, it is possible to improve the mounting ability of the support lip 21 and the holding ability of the abutting member 22, besides that they can be molded from one and the same resin material, thereby it is possible to simplify the manufacturing process of the molding.

Since the molding has a configuration wherein no lips ride over a first grade surface of the vehicle body panel 4, it is possible to reduce the width of the molding 6. Further, by adjusting the fold-back position of the support lip 21, the volume of a channel part formed in the upper part of the support lip 21 can be designed relatively freely, such that a stepped part between the molding body 11, the vehicle body panel 4 and the support lip 21 can be used as a water passage.

Figure 7:
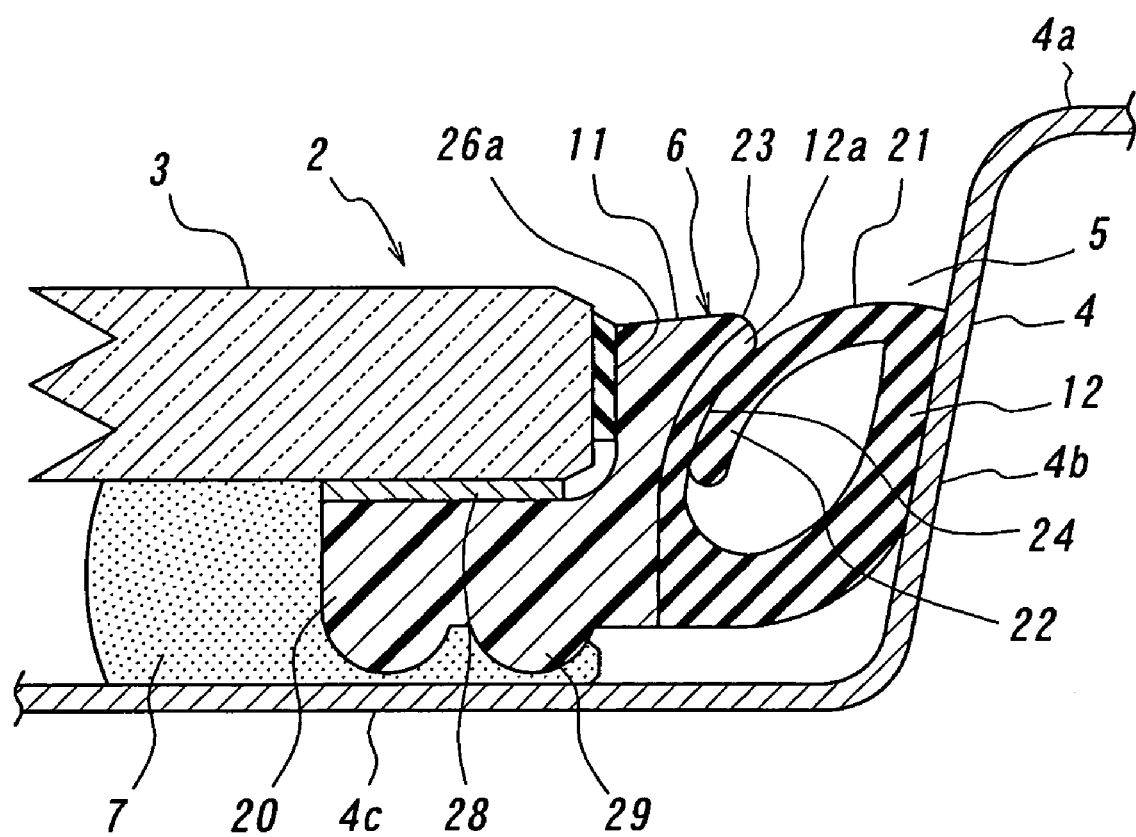
FIG. 7 is a sectional view similar to FIG. 4, illustrating a vehicle window molding according to another embodiment of the present invention, which is also pre-integrated with the windowpane to form a window module.

The vehicle window molding shown in FIG. 7 has a cross-section shape similar to that shown in FIGS. 4 to 6, except that the upper end of the molding body 11 is substantially flush with or situated slightly lower than the outer surface of the windowpane 3, and the head part 25 is eliminated. From the proximal end part of the seal lip 12, an extension 12a extends outward the vehicle from the end part of the molding body 11 on the passenger compartment side, so as to define the holding surface 24. The seal lip 12, the support lip 21, the abutting member 22 and the holding surface 24 are integrally molded from the one and the same resin material. Further, the engaging member 20 is adhered to the windowpane 3 by a double-sided adhesive material 22. The engaging member 20 has a protrusion 29 projecting from a part that abuts against the passenger compartment side of the windowpane 3 toward the flange 4c of the vehicle body panel 4. The adhesive 7 is highly viscous, so that no dam rubber 8 is used.

With the above-mentioned window molding 6, the engaging member 20 of the molding body 11 is fixed to the passenger compartment side end part of the windowpane 3 by the double sided adhesive material 28 so as to fit the molding 6 to the outer peripheral edge surface of the windowpane 3, and the molding 6 is inserted in the flange 4c side together with the windowpane 3, and is fixed by curing the adhesive 7. The other process steps are similar to those for the molding shown in FIGS. 4 and 5.

The vehicle window molding 6 fitted as described above exhibits functional advantages similar to those of the molding shown in FIGS. 4 to 6. Since the molding 6 has a configuration that does not include the head part 25, and no lips ride over a first grade surface of the vehicle body panel 4, it is possible to minimize the width of the molding 6. The protrusion 29 of the molding 6 serves to prevent the windowpane 3 from being recessed inwards, i.e., toward the passenger compartment of the vehicle. Further, the proximal end part of the seal lip 12 extends outward the vehicle body form the end part of the molding body 11 on the passenger compartment side so as to define the holding surface 24. The seal lip 12, the support lip 21, the abutting member 22 and the holding surface 24 are integrally molded from one and the same resin material, thereby making it possible to simplify manufacture of the molding.

It will be appreciated from the foregoing description that the present invention provides a vehicle window molding wherein the molding body abuts against the outer peripheral edge surface of the windowpane while the engaging member extending from the molding body abuts against the passenger compartment side of the windowpane, wherein the seal is extending from the molding body abuts against a stepped surface of a vehicle body panel while the support lip extends from the part of the seal lip which abuts against the stepped surface, to the molding body side, and wherein the abutting member formed in the distal end part of the support lip abuts against and presses the holding surface of the holding member of the molding body in a slidable condition in which holding surface of the holding member of the molding body holds the abutting member of the support lip. Therefore, in the window molding according to the present invention, the molding body can hardly lean toward the vehicle body panel even when an external force is exerted from the windowpane so as to prevent accumulation of dust in a gap that may be otherwise formed between the molding body and the windowpane. Furthermore, the lip is prevented from riding over a first grade surface of the vehicle body so that the width of the molding can be reduced, thereby realizing a vehicle window molding which can be simply and precisely installed and which exhibits an excellent appearance of the window as a whole even under fluctuation in the positional relationship between the windowpane and the vehicle body panel, and which prevents formation of a gap even along a corner part of the window, thereby preventing generation of noise occurs during high-speed running of the vehicle.

While the present invention has been described above with reference to certain preferred embodiments thereof, they have been presented by way of examples only, and various modifications or alterations may be made without departing from the scope of the invention as defined by the appended claims. Thus, for example, while the window molding according to the present invention has been explained above as being one for a vehicle front window or windshield, it may be equally applied to a vehicle rear window.

The invention claimed is:

1. A vehicle window molding for covering a gap between an outer peripheral edge surface of a vehicle windowpane and a vehicle body panel, comprising:
   a molding body mounted so as to abut against the outer peripheral end surface of the windowpane;
   an engaging member extending from the molding body so as to engage with the windowpane on the side of a passenger compartment of the vehicle body;
   a seal lip extending from the molding body so as to abut against a stepped surface of the vehicle body panel;
   a support lip extending toward the molding body from a part of the seal lip where the seal lip abuts against said stepped surface;
   an abutting member formed at a distal end part of the support lip so as to press the molding body in a slidable condition; and
   a holding member having a holding surface which abuts against the support lip so as to hold the abutting member of the support lip in a condition in which the molding is fitted to the vehicle body, wherein the abutting member has a first radius of curvature and the holding member has a second radius of curvature with the first radius of curvature and the second radius of curvature being different.

2. A vehicle window molding according to claim 1, wherein the holding member has a curved holding surface against which abuts the abutting member of the support lip.

3. A vehicle window molding according to claim 1, wherein the molding body has a head part which extends so as to engage with the windowpane on the outside of the vehicle body.

4. A vehicle window molding according to claim 1, wherein at least one of the seal lip and the support lip is made of a soft material that is lower in stiffness than the molding body.

5. A vehicle window molding according to claim 1, wherein the holding surface of the holding member is made of a soft material that is lower in stiffness than the molding body.

6. A vehicle window molding according to claim 5, wherein a distal end part of the seal lip has an extension extending outward of the vehicle body, from an end part of the molding body on the side of the passenger compartment, said extension extending along the holding member so as to form a holding surface.

7. A vehicle window molding according to claim 1, wherein the molding body has a cushion member made of a soft material, which is lower in stiffness than the molding body, in a part thereof where the molding body abuts against the windowpane.

8. A vehicle window module, comprising:
a windowpane; and
a window molding for covering a gap between an outer peripheral edge surface of the windowpane and a vehicle body panel, said window molding being pre-integrated with said windowpane so as to be mounted in place together with the windowpane, said window molding comprising:
  a molding body mounted in abutment against the outer peripheral end surface of the windowpane;
  an engaging member extending from the molding body in engagement with the windowpane on the side of a passenger compartment side of the vehicle body;
  a seal lip extending from the molding body so as to abut against a stepped surface of the panel of a vehicle body;
  a support lip extending toward the molding body from a part of the seal lip where the seal lip abuts against the stepped surface;
  an abutting member and formed in a distal end part of the support lip so as to press the molding body in a slidable condition; and
  a holding member having a holding surface which abuts against the support lip so as to hold the abutting member of the support lip in a condition in which the molding is fitted to the vehicle body, wherein the abutting member has a first radius of curvature and the holding member has a second radius of curvature with the first radius of curvature and the second radius of curvature being different.

9. A vehicle window module according to claim 8, wherein the holding member has a curved holding surface against which abuts the abutting member of the support lip.

10. A vehicle window module according to claim 8, wherein the molding body has a head part which extends in engagement with the windowpane on the outside of the vehicle body.

11. A vehicle window module according to claim 8, wherein at least one of the seal lip and the support lip is made of a soft material that is lower in stiffness than the molding body.

12. A vehicle window module according to claim 8, wherein the holding surface of the holding member is made of a soft material that is lower in stiffness than the molding body.

13. A vehicle window module according to claim 12, wherein a distal end part of the seal lip has an extension extending outward of the vehicle body, from an end part of the molding body on the side of the passenger compartment side, said extension extending along the holding member so as to form a holding surface.

14. A vehicle window module according to claim 8, wherein the molding body has a cushion member made of a soft material that is lower in stiffness than the molding body, in a part thereof where the molding body abuts against the windowpane.

15. A vehicle window molding according to claim 1, wherein in a non-assembled position of the window molding, the first radius of curvature of the abutting member is smaller than the second radius of curvature of the holding member.

16. A vehicle window molding according to claim 1, wherein in an assembled position of the window molding, an end of the abutting member is spaced from the holding member.

17. A vehicle window module according to claim 8, wherein in a non-assembled position of the window molding, the first radius of curvature of the abutting member is smaller than the second radius of curvature of the holding member.

18. A vehicle window module according to claim 8, wherein in an assembled position of the window molding, an end of the abutting member is spaced from the holding member.

* * * * *